(12) United States Patent
Jarecki et al.

(10) Patent No.: US 12,442,481 B2
(45) Date of Patent: Oct. 14, 2025

(54) MULTI-LAYER EXHAUST INSULATION SYSTEMS AND METHODS

(71) Applicant: Lincoln Industries, Inc., Lincoln, NE (US)

(72) Inventors: John Michael Jarecki, Lincoln, NE (US); Adam James Matzner, Lincoln, NE (US)

(73) Assignee: Lincoln Industries, Inc., Lincoln, NE (US)

( * ) Notice: Subject to any disclaimer, the term of this patent is extended or adjusted under 35 U.S.C. 154(b) by 343 days.

(21) Appl. No.: 17/854,973

(22) Filed: Jun. 30, 2022

(65) Prior Publication Data

US 2023/0003334 A1    Jan. 5, 2023

Related U.S. Application Data

(60) Provisional application No. 63/217,360, filed on Jul. 1, 2021.

(51) Int. Cl.
   *F16L 59/02* (2006.01)
   *F16L 59/10* (2006.01)

(52) U.S. Cl.
   CPC .......... *F16L 59/029* (2013.01); *F16L 59/027* (2013.01); *F16L 59/028* (2013.01); *F16L 59/10* (2013.01)

(58) Field of Classification Search
   CPC .. F10N 13/14; B32B 5/02; B32B 5/12; B32B 5/26; B32B 27/12; B32B 27/28
   USPC ......................................... 138/149, 137, 140
   See application file for complete search history.

(56) References Cited

U.S. PATENT DOCUMENTS

| | | | |
|---|---|---|---|
| 2013/0306186 A1* | 11/2013 | Goulet | B32B 1/08 138/149 |
| 2015/0292651 A1* | 10/2015 | Moreau | B29D 23/001 156/149 |
| 2019/0120419 A1* | 4/2019 | Goulet | F16L 5/14 |
| 2019/0263049 A1* | 8/2019 | Goulet | B29C 63/06 |
| 2019/0329486 A1* | 10/2019 | Goulet | D02G 3/22 |
| 2021/0003061 A1* | 1/2021 | Merrett | B32B 5/022 |

* cited by examiner

*Primary Examiner* — David R Deal
(74) *Attorney, Agent, or Firm* — Schwegman Lundberg & Woessner, P.A.

(57) ABSTRACT

Exhaust insulation systems and methods are described that include multiple layers. In one example, a system includes a base insulation layer covering a portion of an exhaust pipe and a hard outer cover formed from a spirally wrapped knit tape and having a length coextensive with the length of the underlying base insulation layer. The wrapped knit tape outer cover can include successive turns of tape overlapping by 25% to 75%. The knit tape can be impregnated with a thermosetting phenolic resin prior to being wrapped about the pipe.

15 Claims, 12 Drawing Sheets

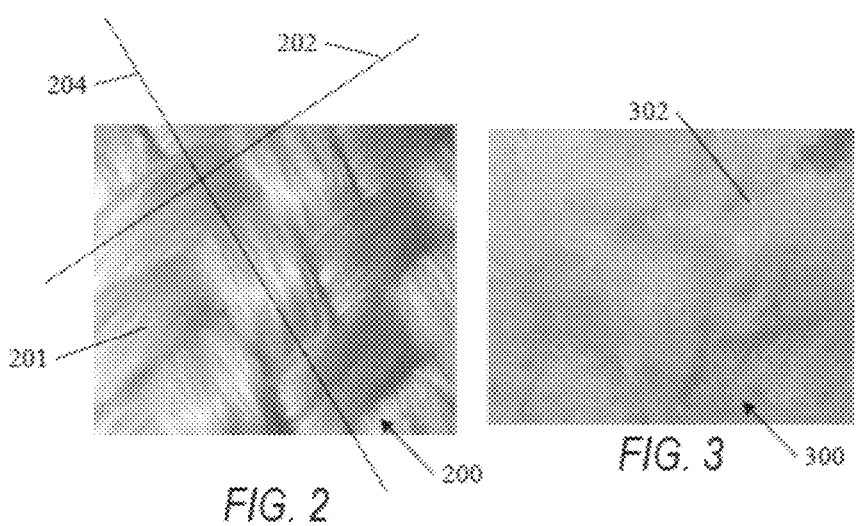

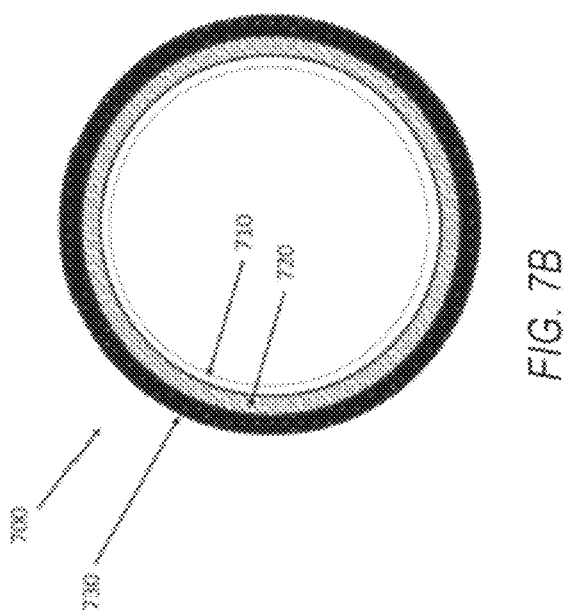

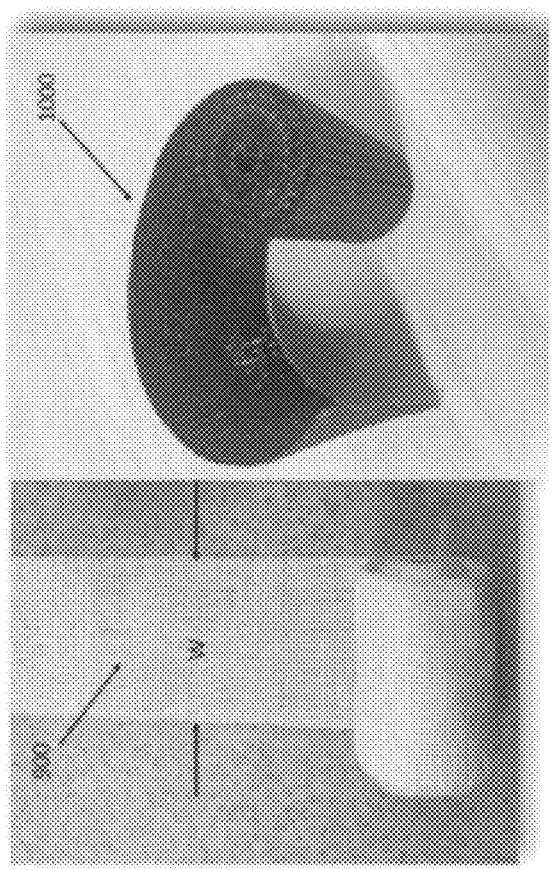

MULTI-LAYER EXHAUST INSULATION SYSTEMS AND METHODS

CLAIM OF PRIORITY

This patent application claims the benefit of priority, under 35 U.S.C. § 119(e), to U.S. Provisional Patent Application Ser. No. 63/217,360, entitled "MULTI-LAYER EXHAUST INSULATION SYSTEMS AND METHODS," filed on Jul. 1, 2021, which is hereby incorporated by reference herein in its entirety.

TECHNICAL FIELD

Various embodiments described herein relate to insulation systems. One specific example includes exhaust pipe insulation systems.

BACKGROUND

Insulation systems can be used to retain heat or cold within an enclosure. Insulation systems can also be used for safety to protect users from a hot region of equipment. In selected insulation systems, multiple material layers are used, wherein each layer serves a different purpose. Improved exhaust insulation systems are desired.

BRIEF DESCRIPTION OF THE DRAWINGS

FIG. 2 shows a portion of a braided fiber material layer according to an embodiment.

FIG. 3 shows a portion of a fiber mat insulation layer according to an embodiment.

FIGS. 7A and 7B show an exhaust insulation system according to an embodiment.

FIG. 9 shows a knit tape according to an embodiment.

FIG. 10 shows a knit tape impregnated with a resin according to an embodiment.

Figure 15:
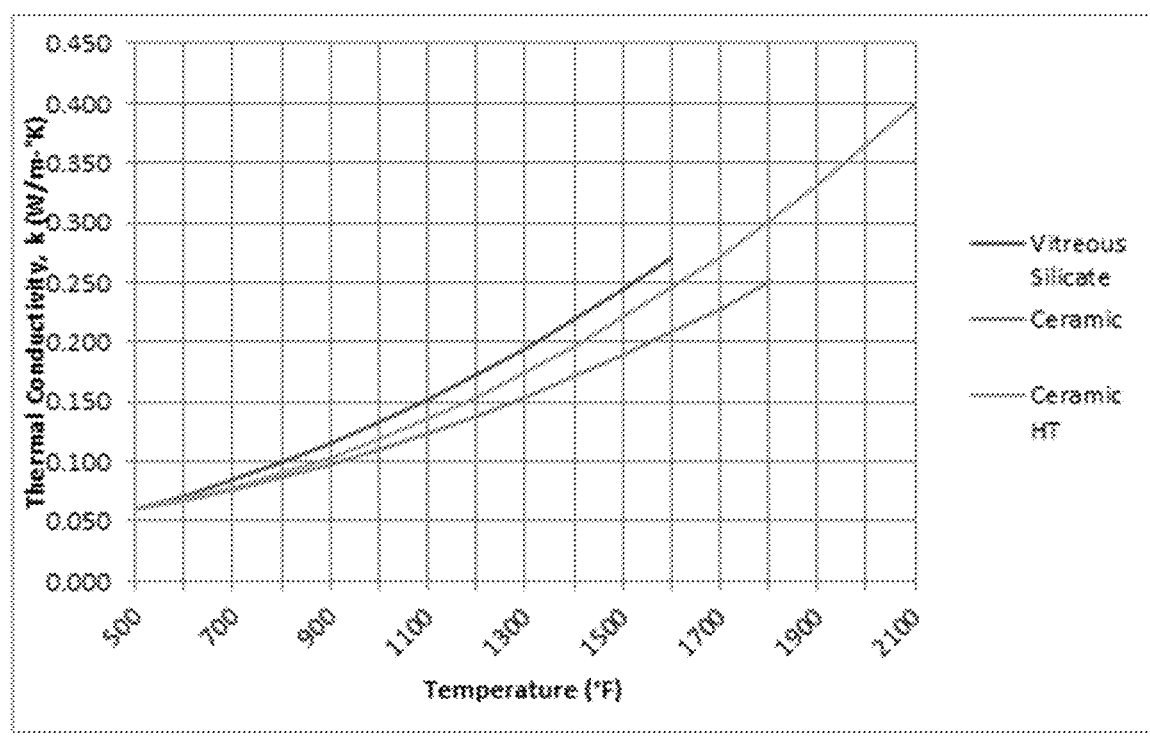

The fiber mat insulation layer 110 may, for example, be formed from a fiber mat such as a vitreous silicate fiber mat, a ceramic fiber mat or a high-temperature (HT) ceramic fiber mat. In one example, a combination of fiber types may be included in the fiber mat insulation layer 110. The type of mat may be selected based on performance characteristics. The chart in FIG. 15 illustrates thermal conductivity versus temperature for three different fiber mats.

DETAILED DESCRIPTION

In the following detailed description of the invention, reference is made to the accompanying drawings that form a part hereof and in which are shown, by way of illustration, specific embodiments in which the invention may be practiced. These embodiments are described in sufficient detail to enable those skilled in the art to practice the invention. Other embodiments may be utilized and structural, logical, and electrical changes may be made.

Figure 1A:
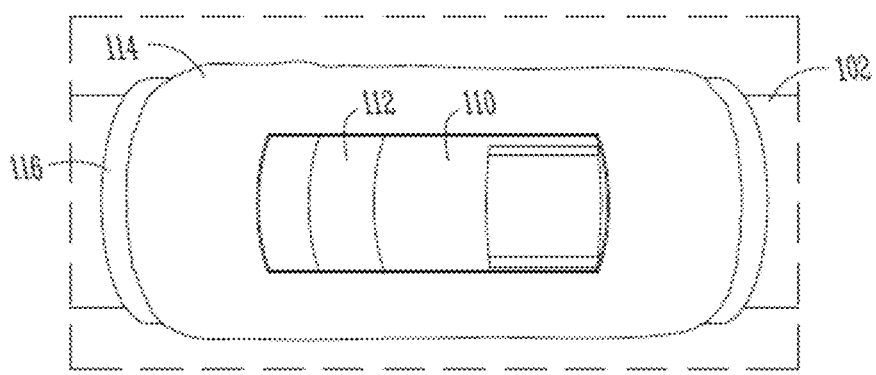
FIG. 1A shows an exhaust insulation system according to an embodiment.

FIG. 1A shows an example of an exhaust insulation system 100. The system 100 is shown over a workpiece 102. In the example of FIG. 1, the workpiece 102 includes an exhaust component, although the invention is not so limited. More specifically, the workpiece 102 in FIG. 1, illustrates a section of an exhaust pipe. In selected examples, the exhaust insulation system 100 is implemented to cover a portion of an exhaust pipe to prevent adjacent components from undue heat exposure, or to reduce risk of injury to an operator, by shielding the portion of exhaust pipe. Other exhaust components that may be insulated using examples of the present invention include, but are not limited to, mufflers, manifolds, catalytic converters, etc. Although exhaust components are used as an example, insulation systems described in the present disclosure may be used to insulate any hot or cold component from unwanted external exposure.

The exhaust insulation system 100 includes a base insulation layer 110. In one example, the base insulation layer 110 includes a fiber mat insulation layer. The base insulation layer 110 shown in FIG. 1A illustrates a fiber mat insulation layer. In one example the fiber mat insulation layer includes substantially random fiber orientations within a plane of the mat. In one example the fiber mat insulation layer includes E-glass fibers. One advantage of fiber mat insulation layers includes additional space for trapped air, which increases an insulating property of the fiber mat insulation layer. Another advantage of a fiber mat insulation layer is cost. Fiber mat insulation layers are significantly less expensive than fabric insulation, which reduces an overall cost of the system 100. In one example using a fiber mat insulation layer as a base insulation layer 110, a thickness dimension is controlled, and installation is simplified as described below.

In one example, the fiber mat insulation layer 110 includes a glass fiber mat. Glass fiber mats have an advantage of being less expensive than ceramic fiber mats or other high temperature fiber mats. In selected examples the performance of other fiber materials provides advantages that justify the increased cost over glass fiber mats.

FIG. 15 shows thermal conductivity versus temperature for three different fiber mats according to an embodiment.

A vitreous silicate mat does not form Crystobalite, is bio-soluble and has low irritability when handling. Crystobalite is undesirable in some circumstances due to health concerns. It is also less expensive than ceramic fiber mat and has low shot content. Shot content (the amount of non-fiber particles found in a mat) may be undesirable because non-fiber particles do not trap insulating air as effectively as fibers. Ceramic fibers are more expensive than vitreous silicate but offer insulation up to higher peak and service temperatures. In one example, ceramic fibers have a high melt temperature (>3000° Fahrenheit). Ceramic fiber mats can also provide low heat storage and better sound absorption than a vitreous silicate mat, making it preferred in some installation environments. Ceramic fiber mats can also be free of binder or lubricant and be immune to thermal shock.

In one example, the fiber mat insulation layer includes one or more types of high temperature insulating wool fibers. Examples include, but are not limited to, alkaline earth silicate wool (AES wool), aluminum silicate wool (ASW), refractory ceramic fiber (RCF), and polycrystalline wool (PCW).

In one example, the base insulation layer 110 includes a braided fiber fabric insulation layer, such as a braided glass fabric insulation layer. A braided fabric includes a number of fibers or yarns that are interwoven without yarns being twisted about one another. In one example, a braided base insulation layer 110 includes a bi-axial braided base insulation layer 110. In one example, a braided base insulation layer 110 includes a bi-axial braided sleeve. One advantage of a braided sleeve includes the ability to conform to the workpiece 102 over a large range of diameters. For example, by axially compressing or stretching a braided sleeve, an inner diameter of the braided sleeve may vary by as much as 50 percent.

Additionally, braided sleeves are dimensionally consistent. Once a braided sleeve is installed over a workpiece 102, and an inner diameter is tightened by stretching, there is minimal variation in a thickness of the braided sleeve. If subsequent layers of the system 100 are desired, it is easier to slide them over the base insulation layer 110 if the thickness dimension is consistent. Further, once a braided sleeve is installed, it tends to stay in place, making subsequent layers easier to install. After stretching a braided sleeve, the braided sleeve will tend to grip the workpiece, keeping the braided sleeve in place. A drawback is that a braided glass does not compress once fitted over a component, tends to cost significantly more than mat insulation and can have poorer performance in certain applications.

FIG. 1A further shows a polyimide layer 112 at least partially surrounding the base insulation layer 110. In one example, as can be seen in FIG. 1A, the polyimide layer 112 includes a band of polyimide wrapped spirally around the fiber mat insulation layer 110. In one example, the process of wrapping the fiber mat insulation layer 110 at least partially compresses the fiber mat insulation layer 110. In this way, a thickness of the fiber mat insulation layer 110 is more effectively controlled than with a bare fiber mat insulation layer 110. For example, fiber mat insulation base layer 110 may be compressed by about 40%-60% or more, depending on the application. In one example, the fiber mat insulation layer 110 has a thickness of about 0.75 inches when placed over an exhaust component and a thickness of 0.40 inches after being compressively wrapped by the polyimide layer.

Additionally, by wrapping the fiber mat insulation layer 110, later processing steps in forming the system 100 are facilitated because, for example, the fiber mat insulation layer 110 is held firmly in place by the polyimide layer 112 and the polyimide layer provides a smooth surface and firm base for an outer fabric layer. Although polyimide is shown in FIG. 1A, other materials such as other polymers, or foil materials may also be used within the scope of the invention. Polyimide can provide advantages in certain application over foil material by, for example, moisture resistance, its ease of installation by wrapping, its resistance to automotive chemicals, and its low cost.

FIG. 1A further shows an outer layer 114. In one example the outer layer 114 is impregnated with a resin. In one example, the resin includes a thermoset resin. In one example, the thermoset resin includes an epoxy resin. In one example, the thermoset resin includes a cured phenolic resin. One advantage of phenolic resin includes desirable cure conditions such as cure temperature, and storage lifetime prior to cure. Another advantage of phenolic resin includes low cost, and desirable high temperature properties after cure. A thermoset resin includes properties, in contrast to a thermoplastic resin. Thermoplastic resin (and thermoplastic polymers) are meltable, and can be cycled between a flowable state and a solid or glass like state. In contrast to thermoplastics, thermosets, once cured, cannot be melted. As a result, thermosets provide improved high temperature stability. Thermosets are not susceptible to unwanted melting under high temperature conditions.

In one example, the outer layer includes glass fibers that form the fabric. In one example, the glass fibers include E-glass. In one example the outer layer 114 includes a braided glass fiber fabric. In one example the outer layer 114 includes a bi-axially braided glass fiber fabric. In one example the outer layer 114 includes a knitted glass fiber fabric. A phenolic, thermosetting resin-impregnated braid is illustrated in FIG. 1A. The braid is made from multiple raw glass woven strands, each of the same type. Example fabric weaves that may be used for the outer fabric layer 114 are illustrated in more detail in FIGS. 2, 4 and 5. Although a number of examples are listed, the invention is not so limited. Other resins and other fabric weaves and fabric materials are also within the scope of the invention.

In one example, the fabric includes basalt fibers that form the fabric. In one example, the fabric contains only basalt fibers. In one example basalt fibers include one or more of the minerals plagioclase, pyroxene, and olivine. In one example, the minerals present in the basalt fibers are substantially or completely crystalline, in contrast to amorphous or glassy in microstructure. Advantages of crystalline phase, include, but are not limited to, high strength. Advantages of basalt, include, but are not limited to, low cost and high strength as compared to glass fibers. Unlike with other composites, such as glass fiber, essentially no materials are added during production of basalt fibers. The basalt is simply washed and then melted. Examples of basalt fibers that are suitable for fabrics as described include fibers between 10 and 20 μm in diameter. In one example, basalt fibers have a tensile strength between about 2.8 and 3.1 GPa, which is generally higher than glass fibers.

FIG. 1A further shows one or more retaining bands 116 located on one or more ends of an insulated portion. Although not required, retaining bands 116 may be useful to hold the system 100 in place during a cure step. Retaining bands 116 may also be useful to enclose rough edges of a layer, such as outer fabric layer 114, and to provide an aesthetically pleasing transition from an insulated portion to an un-insulate portion.

Figure 1B:
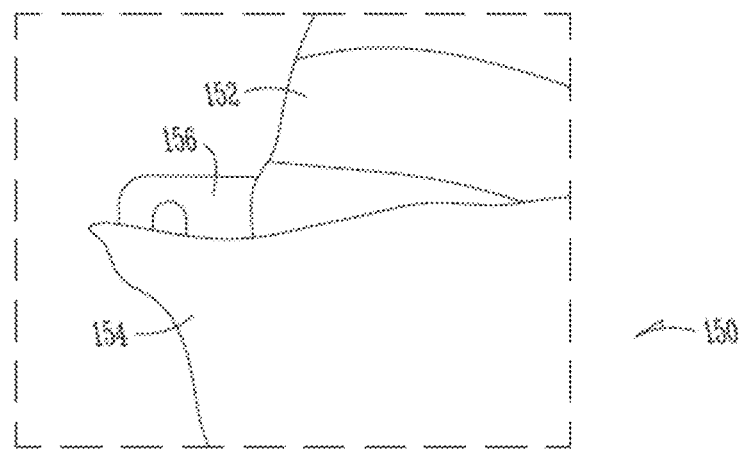
FIG. 1B shows another exhaust insulation system according to an embodiment.

FIG. 1B shows another example of an exhaust insulation system 150. In the example of FIG. 1B, a polyimide layer 152 is shown covering a base insulation layer (not visible in FIG. 1B) similar to base layers 110 described in FIG. 1A. As in the example of FIG. 1A, example base insulation layers include fiber mat insulation, with several possible fiber types. In one example, the fiber mat insulation used in FIG. 1B includes a high temperature insulating fiber, such as a mat including ceramic fibers. The polyimide layer 152 illustrated in FIG. 1B is black in color, in contrast to the orange-brown color of the polyimide 112 in FIG. 1A. Any color of polyimide may be used for layer 152.

A mount 156 is shown coupled to the workpiece. As discussed in examples above, in one example, the workpiece is an exhaust pipe component, although the invention is not so limited. An outer layer 154 is further shown in FIG. 1B. In one example, the outer fabric layer 153 includes a knit fabric weave. In the example of FIG. 1B, the knit fabric weave is capable of additional stretching and contraction over features such as the mount 156. This property is advantageous over other weaves such as a braided weave that may not be capable of the range of expansion and contraction of a knit weave as shown. In one example, the knit weave is impregnated with a resin as discussed in examples above. In one example, the resin includes a thermoset resin. In one example, the thermoset resin includes an epoxy resin. In one example, the thermoset resin includes a phenolic resin. In one example, a knit weave is uniquely capable of stretching over a mount 156, then contracting in place over an exhaust pipe, and subsequently being cured with a highly smooth surface finish as shown in FIG. 1B.

FIGS. 2-5, 13A-13C and 14A-14B show selected example configurations for outer layer 154. In selected examples, as discussed below, the outer layer 154 includes a fabric. In other examples, the outer layer 154 is not a fabric, and instead includes unidirectional fibers, a wound fiber, or other non-fabric examples. In the examples of 2-5, 13A-13C and 14A-14B any number of different fiber materials may be used, although glass fibers are used as an example. Other examples include, but are not limited to, carbon fibers, aramid fibers, basalt fibers, etc. In one example, a mixture of fibers materials are used to form outer layer 114, 154. In other examples, one fiber material is exclusively used to form outer layer 114, 154, for example, only basalt fibers.

FIG. 2 shows an example of a bi-axial braided weave 200 of glass fibers. A first axis 202 and a second axis 204 indicate the two axes of the bi-axial weave. In contrast to a knitted weave, fibers 201 of braided weave 200 shown in FIG. 2 are not twisted around one another, and are instead held together by overlapping. Braided weaves can provide high strength in composite structures in the direction of one or more axes (202, 204) because the fibers are not significantly bent. Fibers typically have higher strength along their axes, compared to fibers with bends or twists.

FIG. 3 shows an example of a fiber mat 300 of glass fibers 302. As illustrated in the Figure, the fibers 302 have a substantially random fiber orientation within a plane of the mat. As noted above, one advantage of fiber mat 300 insulation layers includes additional space for trapped air, which increases an insulating property of the fiber mat insulation layer. Another advantage of a fiber mat 300 insulation layer is cost.

Figure 4:
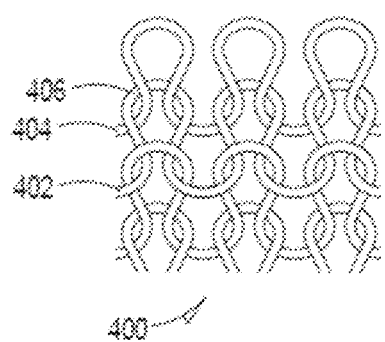
FIG. 4 shows a portion of a knit material layer according to an embodiment.

FIG. 4 shows an example of a knit fiber weave 400. In contrast to the braided weave 200 from FIG. 2, the knit fiber weave 400 includes looped fibers. For example, first fiber 402 is shown looped around second fiber 404 with loop 406. Knit weaves can provide greater flexibility than braided weaves that may be useful in covering complex shapes, or in negotiating large bends in a workpiece.

In one example, a knit weave fabric is used as an outer layer 114 as illustrated in FIG. 1B, and provides ease of installation over other components such as the fiber mat insulation layer 110 and the polyimide layer 112 due to the higher flexibility of knit weaves. In one example, a knit weave is more easily tightened around the fiber mat insulation layer 110 and the polyimide layer 112, and any underlying metal formations in an exhaust system. Ease of tightening provide better conforming of the outer layer 114 over protrusions such as weld joints, mechanical couplings, etc. Knit weaves further provide a smoother final surface finish, which is aesthetically pleasing, and less abrasive to an end user.

Figure 5:
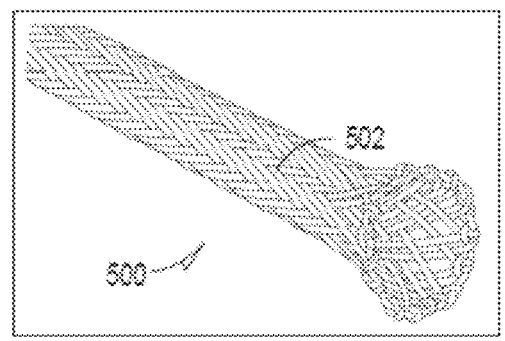
FIG. 5 shows a portion of a braided sleeve layer according to an embodiment.

FIG. 5 shows an example of a sleeve 500. In the example shown, the sleeve 500 is a braided sleeve. Individual fibers 502 are generally not bent in tight twists, although the individual fibers 502 of sleeve 500 do generally spiral around the sleeve 500 in a wide arc. The relative straightness of fibers 502 without significant loops, as compared to loop 406 from knit weave 400, provides higher strength to sleeve 500.

Figure 13A:
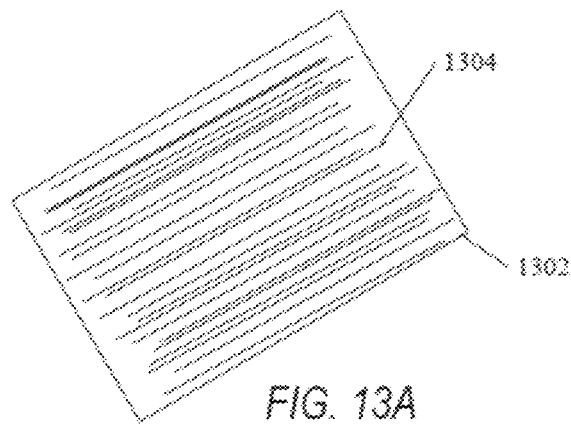
FIG. 13A shows a unidirectional fiber sheet according to an embodiment.

FIG. 13A shows a sheet 1302 including a number of fibers 1304. In contrast to a fabric, the fibers 1304 do not overlap or cross in any substantial way. The sheet 1302 may be used to form an outer layer, such as outer layer 114 or outer layer 154 as described herein. In one example, the sheet 1302 and fibers 1304 are assembled as a prepreg (pre impregnated with a curable resin). Similar to examples discussed above, in one example, the resin includes a thermoset resin. In one example, the thermoset resin includes an epoxy resin. In one example, the thermoset resin includes a phenolic resin.

Figure 13B:
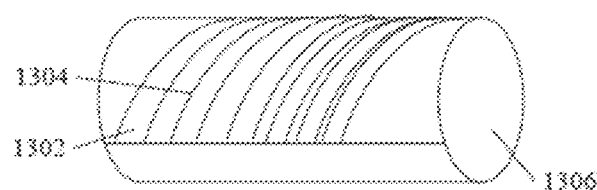
FIG. 13B shows a unidirectional fiber sheet as applied to a workpiece according to an embodiment.
Figure 13C:
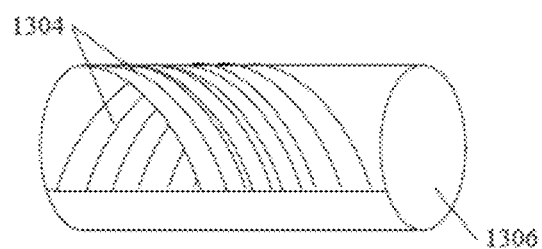
FIG. 13C shows another configuration of a unidirectional fiber sheet as applied to a workpiece according to an embodiment.

FIG. 13B shows the sheet 1302 and fibers 1304 wrapped in a single layer over a workpiece 1306, such as an exhaust component. In the example of FIG. 13C, multiple layers of sheets 1302 may be used to provide fibers 1304 that cross over each other in different directions, although not is a weaved manner, as in a fabric. Multiple layers of sheets 1302 with different fiber 1304 orientations may provide strength to an outer layer 114, 154 along any of several different stress conditions.

Figure 14A:
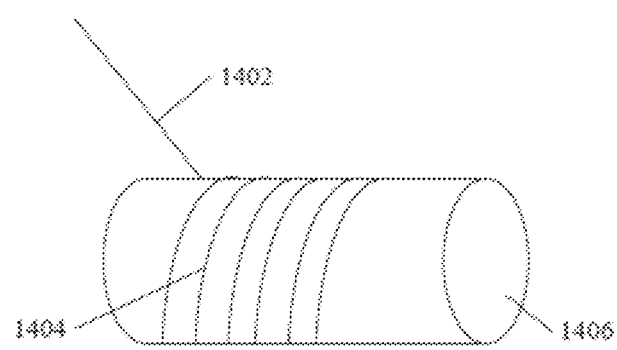
FIG. 14A shows a filament winding manufacturing stage according to an embodiment.

FIG. 14A shows a stage of a filament winding process to form another example of an outer layer, such as outer layer 114 or outer layer 154 as described herein. A single filament or fiber 1402 is used to make multiple windings 1404 over a workpiece 1406, such as an exhaust component. In one example the filament 1402 may be dipped or otherwise coated in a resin. Similar to examples discussed above, in one example, the resin includes a thermoset resin. In one example, the thermoset resin includes an epoxy resin. In one example, the thermoset resin includes a phenolic resin. In contrast to a fabric, which contains multiple interlaced filaments, a single filament fiber is used to form the outer layer 114, 154.

Figure 14B:
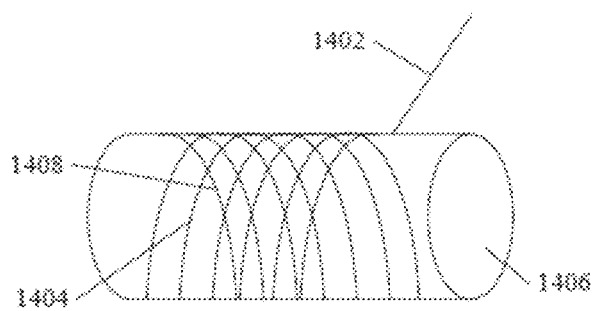
FIG. 14B shows another filament winding manufacturing stage according to an embodiment.

FIG. 14B shows a configuration where a second set of windings 1408 are formed to provide a different filament orientation for increased strength. Similar to the example of FIG. 13C, different fiber orientations may provide strength to an outer layer 114, 154 along any of several different stress conditions.

Figure 6:
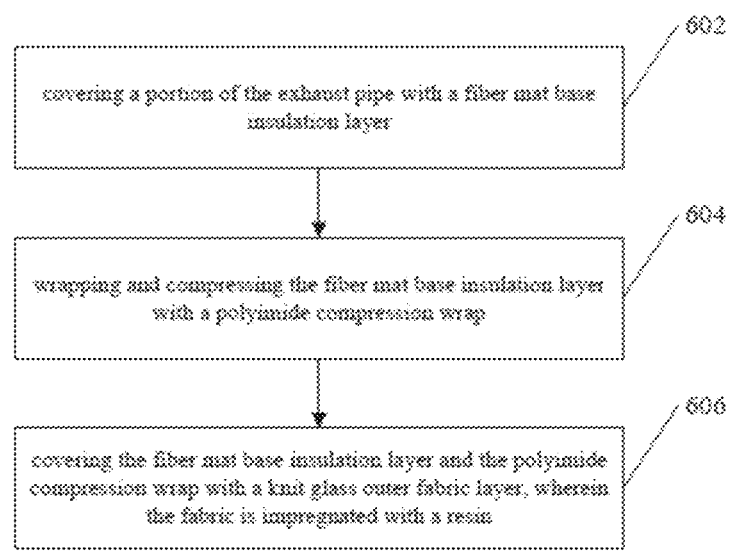
FIG. 6 shows a flow diagram of a method of insulating an exhaust pipe according to an embodiment.

FIG. 6 shows a flow diagram of an example method of insulating an exhaust pipe. In operation 602, a portion of an exhaust pipe is covered with a fiber mat base insulation layer (e.g., vitreous silicate mat, ceramic fiber mat, other fibers, or combinations of fibers). In operation 604, the base insulation layer is wrapped and compressed with a compression wrap (e.g., a polyimide film, foil film, etc.). In operation 606, the inner fiber mat insulation layer and the compression wrap is covered with an outer layer, wherein the outer layer is impregnated with a resin. In selected examples, the resin is later cured to harden the outer layer. For example, a raw glass braid outer layer is first dipped in a phenolic resin and allowed to semi-cure. The semi-cured braid is then placed over an exhaust part (already wrapped with a polyimide film over a fiber mat base layer) and thereafter given a final cure at an elevated temperature to harden the outer layer and form a composite cover for the exhaust insulation system. In some examples, after cooling, the hardened cover is secured to the exhaust part with high strength stainless steel bands on both ends.

Figure 7A:
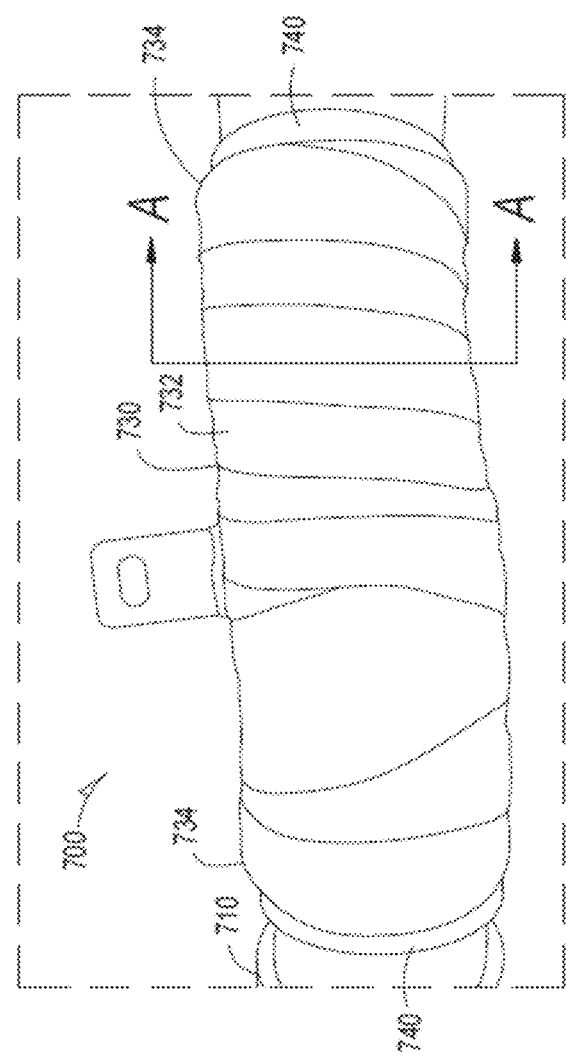

FIGS. 7A and 7B illustrate an example exhaust insulation system 700 for a workpiece such as an exhaust pipe 710. The insulation system 700 includes a base insulation layer 720 (show in FIG. 7B) disposed about a section of the exhaust pipe 710. The base insulation layer 720 can, for example, be a fiber mat (e.g., insulation blanket) tape wrapped about the pipe 710. The base insulation layer 720 can be made from the materials described with regard to the above embodiments. The insulation system 700 further includes a hard outer cover 730 formed from a knit tape 732 impregnated with a resin such as a thermosetting phenolic resin. The knit tape 732 can be impregnated with the resin as described further below. The knit tape 732 is wrapped spirally about the base insulation layer 720 and the section of the exhaust pipe 710. Advantageously, the knit tape outer cover 730 and underlying insulation layer 720 can be substantially coextensive in length. For example, the base insulation layer 720 can extend between the ends 734 of the knit tape outer cover 730. The exhaust insulation system 700 can further include retaining bands 740 (e.g., clamps) on the ends 734 of the knit wrap outer cover 730 to clamp the outer cover to the exhaust pipe 710. In other embodiments, a mold can be placed over the ends of the knit tape during curing and then removed. The molds can stabilize the ends of the hard cover so that no retaining bands or clamps are needed. In some embodiments, molds can be used during curing and retaining bands can also be provided.

In the illustrated exhaust insulation system of FIGS. 7A and 7B, the knit tape outer cover 730 is disposed directly adjacent the base insulation layer 720 without an intervening layer of material. In other embodiments, the exhaust insulation system 700 can include a middle layer comprising a polyimide band wrapped spirally around the base insulation layer and disposed between the base insulation layer and the knit outer cover. The band of polyimide can compress the base insulation layer 720 against the exhaust pipe 710. The optional polyimide band can be similar to the bands described above.

As noted above, the hard outer cover 730 can be formed from a knit tape 732 wrapped about the underlying insulation. The knit tape 732 can, for example, be formed from fiberglass or e-fiberglass, have a thickness ranging from 0.010 to 0.025 inches, and have a width ranging from 2 to 4 inches. The knit tape 732 can be a warp knitted fabric with a raschel knit, for example. In one example, the knit tape 732 is a 3 inch wide fiberglass tape having a nominal thickness of 0.023 inches or between 0.020 and 0.025 inches (see, e.g., FIGS. 9 and 10 for examples of knit tapes). The outer cover 730 can include successive turns of the knit tape 732 where, e.g., a second turn of the knit tape 732 overlaps a first, adjacent turn by an overlap amount ranging from 25% to 75% of a width of the knit tape 732. It has been found that it can be important for the tape width, thickness, overlap amount to be within these ranges so that the outer cover 730 after curing can be sufficiently hard and durable to resist cracking, be impact resistant and be splinter resistant while at the same time being smooth. As compared to outer covers using braided fabric or knit fabric sleeves and/or braided or knit fabrics with texturized yarns, the knit tape outer cover 730 described herein can be smooth after curing and require no or minimal post-cure smoothing (e.g., deburring and/or sanding) to remove burrs and sharp fibers as can be the case with braided fabric outer layer. The knit tape 732 can also flex and stretch. This can, for example, allow the tape to lie substantially flat against the pipe, to wrap around bends and other components (e.g., tabs) on a workpiece, and to provide compression against the underlying insulation layer. The knit tape 732 can, for example, provide compression of the base insulation layer, in a similar manner as a polyimide band as discussed above.

Figure 8:
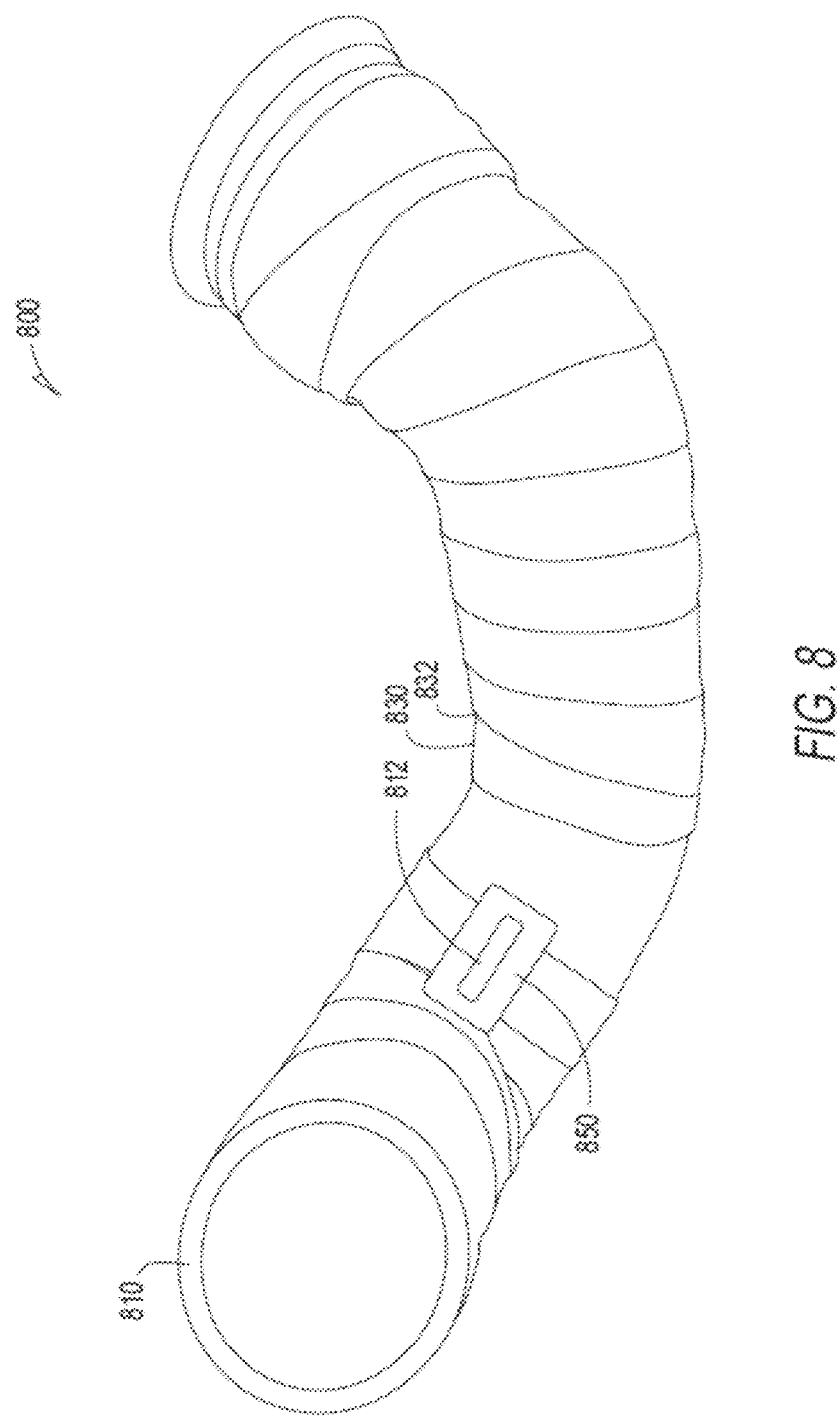
FIG. 8 shows an exhaust insulation system according to an embodiment.

FIG. 8 illustrates an insulation system 800 on a workpiece such as an exhaust pipe 810 having bends. The insulation system 800 can include a base insulation layer (not shown) and hard outer cover 830 made from a knit tape 832, as discussed above with regard to FIGS. 7A and 7B. In some embodiments, the exhaust pipe 810 can include a bracket 812 extending outward from the pipe 810. The bracket 812 can be welded to the pipe, for example. The use of a knit tape 832 to form the outer cover 830 facilitates the assembly of the knit tape 832 around the bracket. The insulation system 800 can further include a plate 850 disposed around the bracket and over the knit tape 832 to facilitate securing the outer cover 830 to the pipe 810. The plate 850 can be interference fit around the bracket 812 or can be provided with tabs that can be welded to the bracket, as examples. Using knit tape to form an outer cover, as illustrated in FIGS. 7A, 7B and 8 for example, allows for easier formation of the cover generally and in particular around bends and tabs of a pipe. A knit tape wrapped cover can better accommodate different diameter pipes as compared to knit or braided sleeves which are generally custom designed for specific diameter pipes. FIGS. 9 and 10 illustrate knit tape having a width W with FIG. 9 showing the knit tape 900 before being impregnated with a resin and FIG. 10 showing a resin-impregnated knit tape 1000 in a semi-cured state.

Figure 11:
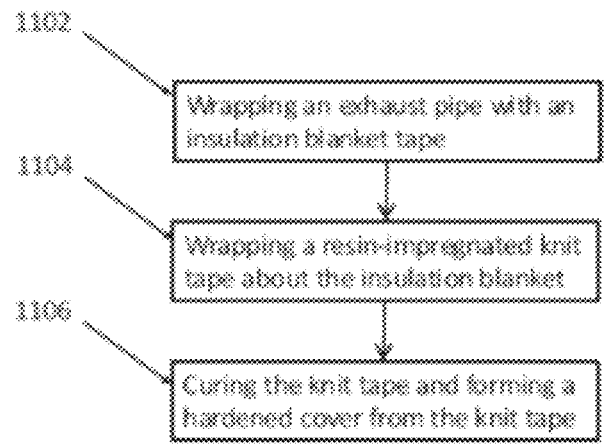
FIG. 11 shows a flow diagram of a method of insulating and exhaust pipe to an embodiment.
Figure 12:
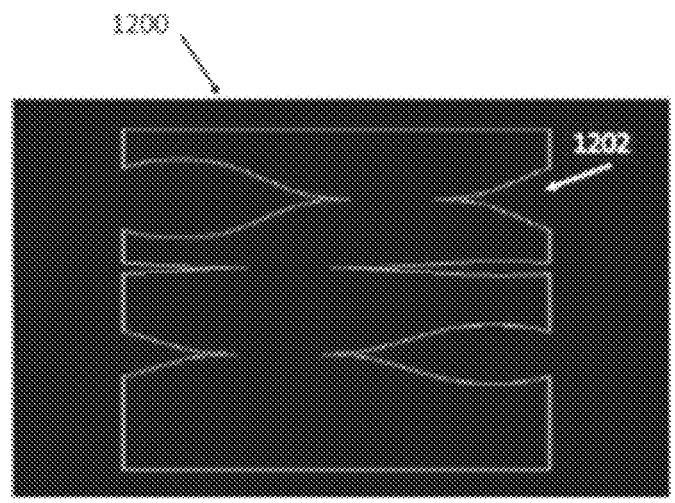
FIG. 12 shows insulation cut to a pattern according to an embodiment.

FIG. 11 illustrates a method of insulating an exhaust pipe. At block 1102, a portion of an exhaust pipe is covered with an insulation layer having ends and defining a length between the ends. The insulation layer can, for example, be formed by wrapping an insulation blanket of a desired length about the pipe. The insulation layer can be formed from various materials as described above. In one example, the insulation is cut (e.g., plotter-cut) in a pattern to fit the exhaust pipe section. An example of insulation 1200 cut to a pattern for fitting an exhaust pipe with bends is illustrated in FIG. 12. The cutouts 1202 in the pattern can relieve bunching in the bends of the exhaust pipe.

At block 1104, a resin-impregnated knit tape can wrapped about the portion of the exhaust pipe. The knit tape can be spirally wrapped to be coextensive with the length of the insulation layer. The knit tape can for example be impregnated with a thermoset phenolic resin and wrapped about the insulating layer while in a semi-cured state. FIGS. 9 and 10 illustrate an example knit tape 900 before (FIG. 9) and after (FIG. 10) being impregnated with a resin. The knit tape 900 can be wrapped directly about the insulation layer or optionally a compressive, polyimide band can be wrapped about the insulation layer prior to wrapping the knit tape.

The knit tape can be impregnated with the resin by dipping the knit tape in the resin, by purchasing pre-impregnated (prepreg) tape, or though other techniques. The knit tape includes natural gaps in its fabric and impregnating the knit tape with resin can include applying an amount of the thermoset resin so that after the heating of the knit tape (block 1106) the cured thermoset resin covers the gaps (e.g., spans the gaps so that none of the underlying insulating layer is exposed). The amount of dry resin used can range from 100%-120% of the raw knit tape weight. Using an amount of dry resin in this range can advantageously provide a smooth, durable outer cover with a resin (when fully cured) that spans gaps in the knit tape.

At block 1106, the resin-impregnated knit tape can be heated to cure the thermosetting resin and form a hardened outer cover. Wrapping the knit tape can include wrapping successive turns of the knit tape with an overlap. For example, one turn of the knit tape can overlap an adjacent turn of the knit tape by an overlap amount ranging from 25% to 75% of the width of the knit tape. The knit tape can have similar width, thickness and other characteristics as the knit tape described above. As discussed above, after curing the outer cover can be sufficiently hard and durable to resist cracking, be impact resistant and be splinter resistant while at the same time being smooth. The exhaust pipe as insulated can thereafter be assembled and/or used in a high heat application without need for deburring.

The method can further include providing retainer bands such as clamps on the ends of the knit cover to secure the cover to the pipe. This can be done after curing the knit tape. The method can further include providing a mold over the ends of the knit tape and curing the knit tape with the molds in place to stabilize and secure the ends of the knit cover. The molds are then removed after curing. In this case, the final system can be used without retaining bands securing the hardened outer cover, though in other embodiments, retaining bands can be used in addition to using a mold during curing. Where the pipe includes a bracket, a plate can be provided around the bracket to facilitate securing the knit tape to the pipe. This can also be done after curing the knit tape.

To better illustrate the method and apparatuses disclosed herein, a non-limiting list of embodiments is provided here:

Example 1 is an exhaust insulation system for an exhaust pipe that includes a base insulation layer and an outer cover of knit tape. The base insulation layer is disposed about a section of the exhaust pipe, and the outer cover of knit tape is spirally wrapped about the base insulation layer and the section of the exhaust pipe. The knit tape outer cover is impregnated with a resin and has opposing ends longitudinally along a length of the section of exhaust pipe and the base insulation layer extends between the ends of the knit tape outer cover.

Example 2 includes the exhaust insulation system of example 1, wherein the knit tape outer cover includes resin impregnated glass fibers.

Example 3 includes the exhaust insulation system of any one of examples 1-2, wherein the knit tape outer cover includes resin impregnated basalt fibers.

Example 4 includes the exhaust insulation system of any one of examples 1-3, with the knit tape outer cover being disposed directly adjacent the base insulation layer without an intervening layer of material.

Example 5 includes the exhaust insulation system of any one of examples 1-4, where the system further includes a middle layer comprising a polyimide band wrapped spirally around the base insulation layer and disposed between the base insulation layer and the knit outer cover.

Example 6 includes the exhaust insulation system of any one of examples 1-5, where the band of polyimide compresses the base insulation layer against the exhaust pipe.

Example 7 includes the exhaust insulation system of any one or examples 1-6, where the knit tape outer cover is impregnated with a phenolic thermoset resin.

Example 8 includes the exhaust insulation system of any one of examples 1-7, where the system includes retaining bands on the ends of the knit wrap outer cover to clamp the outer cover to the exhaust pipe.

Example 9 includes the exhaust insulation system of any one of examples 1-8, where the knit tape of the outer cover includes a second turn of the knit tape which overlaps a first, adjacent turn of the knit tape by an overlap amount ranging from 25% to 75% of a width of the knit tape.

Example 10 includes the exhaust insulation system of any one of examples 1-9, where the knit tape of the outer cover has a width range from 2 to 4 inches and a thickness ranging from 0.010 to 0.025 inches.

Example 11 includes the exhaust insulation system of any one of examples 1-10, where the outer cover is substantially smooth with minimal or no post-cure smoothing.

Example 12 includes a method of insulating an exhaust pipe. The method includes covering a portion of the exhaust pipe with insulation to form an insulation layer having ends and defining a length between the ends. The method further includes spirally wrapping a knit tape about the portion of the exhaust pipe and the length of the insulation layer. The knit tape is impregnated with a thermoset resin and is in a semi-cured state while being wrapped. Finally, the method of example 10 includes heating the knit tape to cure the thermoset resin and form a hardened outer cover.

Example 13 includes the method of insulating an exhaust pipe of example 12 where the method further includes wrapping and compressing the insulation layer with a spiral band of polyimide compression wrap prior to wrapping the portion of the exhaust pipe and length of the insulation layer with the knit tape.

Example 14 includes the method of insulating an exhaust pipe of any one of examples 12-13, where the thermoset resin includes a phenolic resin, and the method further includes dipping the knit tape in the phenolic resin prior to spirally wrapping the knit tape about the exhaust pipe.

Example 15 includes the method of insulating an exhaust pipe of any one of examples 12-14, where wrapping the knit tape includes wrapping a second turn of the knit tape to overlap a first, adjacent turn of the knit tape by an overlap amount ranging from 25% to 75% of a width of the knit tape.

Example 16 includes the method of insulating an exhaust pipe of any one of examples 12-15, where the knit tape has a width ranging from 2 to 4 inches and a thickness ranging from 0.010 to 0.025 inches.

Example 17 includes the method of insulating an exhaust pipe of any one of examples 12-16, where the knit tape includes multiple perforations and where the knit tape includes an amount of the thermoset resin so that after the heating of the knit tape the cured thermoset resin covers the perforations.

Example 18 includes the method of insulating an exhaust pipe of any one of examples 12-17, where the knit tape is wrapped directly about the insulation blanket without an intervening layer between the insulation blanket and the knit tape.

Example 19 includes the method of insulating an exhaust pipe of any one of examples 12-18, where the knit tape is flexible and stretchable, and the method further includes wrapping the knit tape includes stretching the knit tape over the insulation layer and thereby compressing the insulation layer.

Example 20 includes an exhaust insulation system for an exhaust pipe that includes a base insulation layer and a hard outer cover of knit tape. In this example, the base insulation layer is an insulation blanket disposed about a section of the exhaust pipe. The hard outer cover of knit tape is wrapped spirally about the base insulation layer and the section of the exhaust pipe. The knit tape has a width of 2 to 4 inches and a thickness of 0.020 to 0.025 inches. The hard outer cover includes a cured phenolic thermoset resin, opposing ends and length between the ends coextensive with a length of the base insulation layer, and successive turns of the knit tape including a second turn which overlaps a first, adjacent turn by an overlap amount ranging from 25% to 75% of a width of the knit tape.

Example 21 includes the exhaust insulation system of example 20 where the system further includes a middle layer comprising a polyimide band wrapped spirally around the base insulation layer and disposed between the base insulation layer and the knit outer cover, wherein the band of polyimide compresses the base insulation layer against the exhaust pipe.

Example 22 includes the exhaust insulation system of example 20-21, where the knit tape outer cover is disposed directly adjacent the base insulation layer without an intervening layer of material.

Example 23 includes the exhaust insulation system of any one of examples 20-22, where the knit tape compresses the base insulation layer.

Example 24 includes the exhaust insulation system of any one of examples 20-23, where the system further includes two end retaining bands surrounding the ends of the hard outer cover and at least one middle plate surrounding the hard outer cover and located around or near a bracket of the exhaust pipe.

Example 25 includes an exhaust insulation system for an exhaust pipe. The insulation system includes a base insulation layer of an insulation disposed about a section of the exhaust pipe. The insulation system also includes an outer cover of one or more unidirectional fiber sheets wrapped about the base insulation layer and the section of the exhaust pipe, wherein the one or more unidirectional fiber sheets are impregnated with a resin and wherein the one or more unidirectional fiber sheets has opposing ends longitudinally along a length of the section of exhaust pipe and the base insulation layer extends between the ends of the one or more unidirectional fiber sheets.

Example 26 includes an exhaust insulation system for an exhaust pipe. The insulation system includes a base insulation layer of an insulation disposed about a section of the exhaust pipe. The insulation system also includes an outer cover of a filament wound layer wrapped about the base insulation layer and the section of the exhaust pipe, wherein the filament wound layer is impregnated with a resin and wherein the filament wound layer has opposing ends longitudinally along a length of the section of exhaust pipe and the base insulation layer extends between the ends of the filament wound layer.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An exhaust insulation system for an exhaust pipe, comprising:
    a base insulation layer of an insulation disposed about a section of the exhaust pipe;
    an outer cover of knit tape spirally wrapped about the base insulation layer and the section of the exhaust pipe, wherein the knit tape outer cover is impregnated with a resin and wherein the knit tape outer cover has opposing ends longitudinally along a length of the section of exhaust pipe and the base insulation layer extends between the ends of the knit tape outer cover;
    wherein the knit tape outer cover is disposed directly adjacent the base insulation layer without an intervening layer of material.

2. The exhaust insulation system of claim 1, wherein the knit tape outer cover includes resin impregnated glass fibers.

3. The exhaust insulation system of claim 1, wherein the knit tape outer cover includes resin impregnated basalt fibers.

4. The exhaust insulation system of claim 1, further including a middle layer comprising a polyimide band wrapped spirally around the base insulation layer and disposed between the base insulation layer and the knit outer cover.

5. The exhaust insulation system of claim 4, wherein the band of polyimide compresses the base insulation layer against the exhaust pipe.

6. The exhaust insulation system of claim 1, wherein the knit tape outer cover is impregnated with a phenolic thermoset resin.

7. The exhaust insulation system of claim 1, further including retaining bands on the ends of the knit wrap outer cover to clamp the outer cover to the exhaust pipe.

8. The exhaust insulation system of claim 1, wherein the knit tape of the outer cover includes a second turn of the knit tape which overlaps a first, adjacent turn of the knit tape by an overlap amount, the overlap amount ranging from 25% to 75% of a width of the knit tape.

9. The exhaust insulation system of claim 1, wherein the knit tape of the outer cover has a width range from 2 to 4 inches and a thickness ranging from 0.010 to 0.025 inches.

10. The exhaust insulation system of claim 1, wherein the outer cover is substantially smooth with minimal or no post-cure smoothing.

11. An exhaust insulation system for an exhaust pipe, comprising:
- a base insulation layer of an insulation blanket disposed about a section of the exhaust pipe;
- a hard outer cover of knit tape wrapped spirally about the base insulation layer and the section of the exhaust pipe, wherein the knit tape has a width of 2 to 4 inches and a thickness of 0.020 to 0.025 inches, wherein the hard outer cover includes:
  - a cured phenolic thermoset resin;
  - opposing ends and length between the ends coextensive with a length of the base insulation layer; and
  - successive turns of the knit tape including a second turn which overlaps a first, adjacent turn by an overlap amount ranging from 25% to 75% of a width of the knit tape.

12. The exhaust insulation system of claim 11, further including a middle layer comprising a polyimide band wrapped spirally around the base insulation layer and disposed between the base insulation layer and the knit outer cover, wherein the band of polyimide compresses the base insulation layer against the exhaust pipe.

13. The exhaust insulation system of claim 11, wherein the knit tape outer cover is disposed directly adjacent the base insulation layer without an intervening layer of material.

14. The exhaust insulation system of 13, wherein the knit tape compresses the base insulation layer.

15. The exhaust insulation system of claim 14, further including two end retaining bands surrounding the ends of the hard outer cover and a plate surrounding at least part of the hard outer cover and located around or near a bracket of the exhaust pipe.

\* \* \* \* \*